United States Patent
Mohamed (10) Patent No.: US 10,359,566 B1
(45) Date of Patent: Jul. 23, 2019

(54) PLANAR WAVEGUIDE CONVERTER

(71) Applicant: KING SAUD UNIVERSITY, Riyadh (SA)

(72) Inventor: Ehab Salaheldin Awad Mohamed, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/213,909

(22) Filed: Dec. 7, 2018

(51) Int. Cl.
*G02B 6/12* (2006.01)
*H01P 5/18* (2006.01)
*H01P 5/02* (2006.01)

(52) U.S. Cl.
CPC .......... *G02B 6/12009* (2013.01); *H01P 5/024* (2013.01); *H01P 5/188* (2013.01)

(58) Field of Classification Search
CPC .......... G02B 6/12; G02B 6/4214; G02B 6/43; G02B 6/12009
See application file for complete search history.

(56) References Cited

U.S. PATENT DOCUMENTS

| | | | |
|---|---|---|---|
| 6,798,930 B2 * | 9/2004 | Moeller | G02B 6/12007 385/11 |
| 7,366,421 B2 | 4/2008 | Cho et al. | |
| 9,128,242 B2 | 9/2015 | Kojima et al. | |
| 9,203,542 B2 * | 12/2015 | Simonneau | H04Q 11/0005 |
| 9,348,092 B1 | 5/2016 | Ling et al. | |
| 10,048,441 B1 | 8/2018 | Mohamed | |
| 2010/0014863 A1 * | 1/2010 | Zami | H04J 14/0204 398/79 |
| 2015/0050019 A1 | 2/2015 | Sengupta | |
| 2016/0062039 A1 | 3/2016 | Zhang et al. | |

FOREIGN PATENT DOCUMENTS

EP     2827178 A1    1/2015

OTHER PUBLICATIONS

Kazemi et al. "X-band all-waveguide radial combiner for high power applications." Microwave Symposium (IMS), 2015 IEEE MTT-S International. IEEE, 2015.

* cited by examiner

*Primary Examiner* — Jennifer Doan
(74) *Attorney, Agent, or Firm* — Richard C. Litman (57) ABSTRACT

The planar waveguide converter is a silica-glass, bi-directional planar waveguide converter, providing conversion from an input from a single-mode waveguide to an output for a three or four-mode waveguide. Conversion takes place through an intermediate stage of a pair of two-mode waveguides. In the initial stage, the input from the single-mode waveguide passes through a V-shaped, graded-index mode slicer, where it is converted into a pair of two-mode signals. In the intermediate stage, each of the two-mode signals is received by a corresponding diamond or quadrilateral-shaped phase shifter. The output of each phase shifter is transmitted to an M-shaped, graded-index mode combiner, which outputs either a three or four-mode signal.

5 Claims, 12 Drawing Sheets
(11 of 12 Drawing Sheet(s) Filed in Color)

PLANAR WAVEGUIDE CONVERTER

BACKGROUND

1. Field

The disclosure of the present patent application relates to optical and optoelectronic devices, and particularly to a planar waveguide converter providing conversion from an input from a single-mode waveguide to an output for a three or four-mode waveguide, or from an input from a three or four-mode waveguide to an output for a single-mode waveguide.

2. Description of the Related Art

Photonics integrated circuits (PICs) and planar lightwave circuits (PLCs) with large bandwidths are essential components in high capacity optical communication networks. These circuits are crucial for performing ultrafast optical signal processing operations without sacrificing the network's high capacity. One way to achieve this for single-mode propagating signals is to combine different techniques, such as time-division multiplexing (TDM), wavelength-division multiplexing (WDM), polarization-division multiplexing (PDM), and complex modulation formats. Another way is to convert single-mode signals into multi-mode signals and then multiplex them together over multi-mode waveguides using mode-division multiplexing (MDM) in order to handle high aggregate data rates (i.e., large bandwidths).

At present, a number of different techniques have been used for mode conversion in planar waveguides. For example, two-mode excitation in a few-mode waveguide has been seen using a Mach-Zehnder interferometer. Mode conversion and exchange were both demonstrated for two-mode waveguides. Further, an optical mode converter using tapered waveguide splitters can operate at a single wavelength of 1550 nm. Here, the conversion between TE0 and TE3 modes, in addition to TE1 and TE2 modes, was seen, with an estimated cross-talk of approximately 11.4 dB. Further, symmetric and asymmetric Y-junctions have been proposed for few-mode and multi-mode excitation, where the performance of mode conversion would be dependent on fine-tuning of the taper angle between the Y-junction arms.

Some other techniques are also known using mode-division multiplexing (MDM) as a possible potential application of mode conversion. Different techniques have been reported for on-chip MDM; e.g., data exchange of MDM TE0 and TE1 modes has been demonstrated using silicon-on-insulator (SOI) micro-ring resonators for use in flexible networks. An SOI on-chip MDM for TE0 and TE1 modes plus a WDM switch were demonstrated using single-mode elements. Further, on-chip two-mode MDM using SOI tapered directional couplers has also been demonstrated. Additionally, on-chip simultaneous MDM and polarization division multiplexing were demonstrated using a densely packed waveguide array. All of these techniques involve conversion to, or between, few-mode waveguides that can handle up to two modes. However, an SOI mode multiplexer was demonstrated using asymmetric directional couplers which could handle up to four modes at the same polarization.

It would obviously be desirable to be able to provide similar mode conversion in a relatively simple, single converter which could be easily manufactured. Further, it would be desirable to provide similar mode conversion in a converter made from a silica-glass material, which is not only inexpensive, but exhibits relatively low optical loss and nonlinearities. Thus, a planar waveguide converter solving the aforementioned problems is desired.

SUMMARY

The planar waveguide converter is a silica-glass, bi-directional planar waveguide converter, providing conversion from an input from a single-mode waveguide to an output for a three or four-mode waveguide, or from an input from a three or four-mode waveguide to an output for a single-mode waveguide. Conversion takes place through an intermediate stage of a pair of two-mode waveguides. In the initial stage, the input from the single-mode waveguide passes through a V-shaped, graded-index mode slicer, where it is converted into a pair of two-mode signals. In the intermediate stage, each of the two-mode signals is received by a corresponding diamond or quadrilateral-shaped phase shifter. The output of each phase shifter is transmitted to an M-shaped, graded-index mode combiner, which outputs either a three or four-mode signal.

In the initial stage, the V-shaped, graded-index mode slicer of the planar waveguide converter is formed from first and second optically transmissive branches sharing a common optically transmissive base. The first and second optically transmissive branches each define an optical waveguide, and are symmetrical about a central longitudinal axis. The first and second optically transmissive branches each have inner sides angled with respect to the central longitudinal axis and intersecting at a vertex positioned along the central longitudinal axis. The optically transmissive base has a laterally extending input surface which is longitudinally opposed from the vertex, and each of the first and second optically transmissive branches has a laterally extending output surface parallel to, and longitudinally opposed to, the laterally extending input surface of the base. The laterally extending input surface of the base is adapted for optical connection to a single-mode waveguide for receiving the input single-mode signal.

The intermediate stage is formed from first and second quadrilateral or diamond-shaped phase shifters. Each of the quadrilateral phase shifters has a laterally extending input face and a laterally extending output face. The laterally extending input face of the first quadrilateral phase shifter is in optical communication with the laterally extending output surface of the first optically transmissive branch, and the laterally extending input face of the second quadrilateral phase shifter is in optical communication with the laterally extending output surface of the second optically transmissive branch.

The final stage is formed from an M-shaped, graded-index mode combiner, which has an input surface and an output surface. The input surface of the graded-index mode combiner is in optical communication with the laterally extending output face of each of the first and second quadrilateral phase shifters, and the output surface of the graded-index mode combiner is adapted for optical connection to a multiple-mode waveguide for transmission of the output three or four-mode signal.

These and other features of the present invention will become readily apparent upon further review of the following specification.

BRIEF DESCRIPTION OF THE DRAWINGS

The file of this patent contains at least one drawing executed in color. Copies of this patent with color drawing(s) will be provided by the Office upon request and payment of the necessary fee.

Similar reference characters denote corresponding features consistently throughout the attached drawings.

DETAILED DESCRIPTION OF THE PREFERRED EMBODIMENTS

The planar waveguide converter 10 is a silica-glass, bi-directional planar waveguide converter, providing conversion from an input from a single-mode waveguide 18 to an output for a three or four-mode waveguide 50, or from an input from the three or four-mode waveguide 50 to an output for the single-mode waveguide 18. As will be described in greater detail below, conversion takes place through an intermediate stage of a pair of two-mode waveguides. In the initial stage, the input from the single-mode waveguide 18 passes through a V-shaped, graded-index mode slicer, where it is converted into a pair of two-mode signals. In the intermediate stage, each of the two-mode signals is received by a corresponding diamond or quadrilateral-shaped phase shifter 40, 42. The output of each phase shifter 40, 42 is transmitted to an M-shaped, graded-index mode combiner 48, which outputs either a three or four-mode signal.

Figure 1:
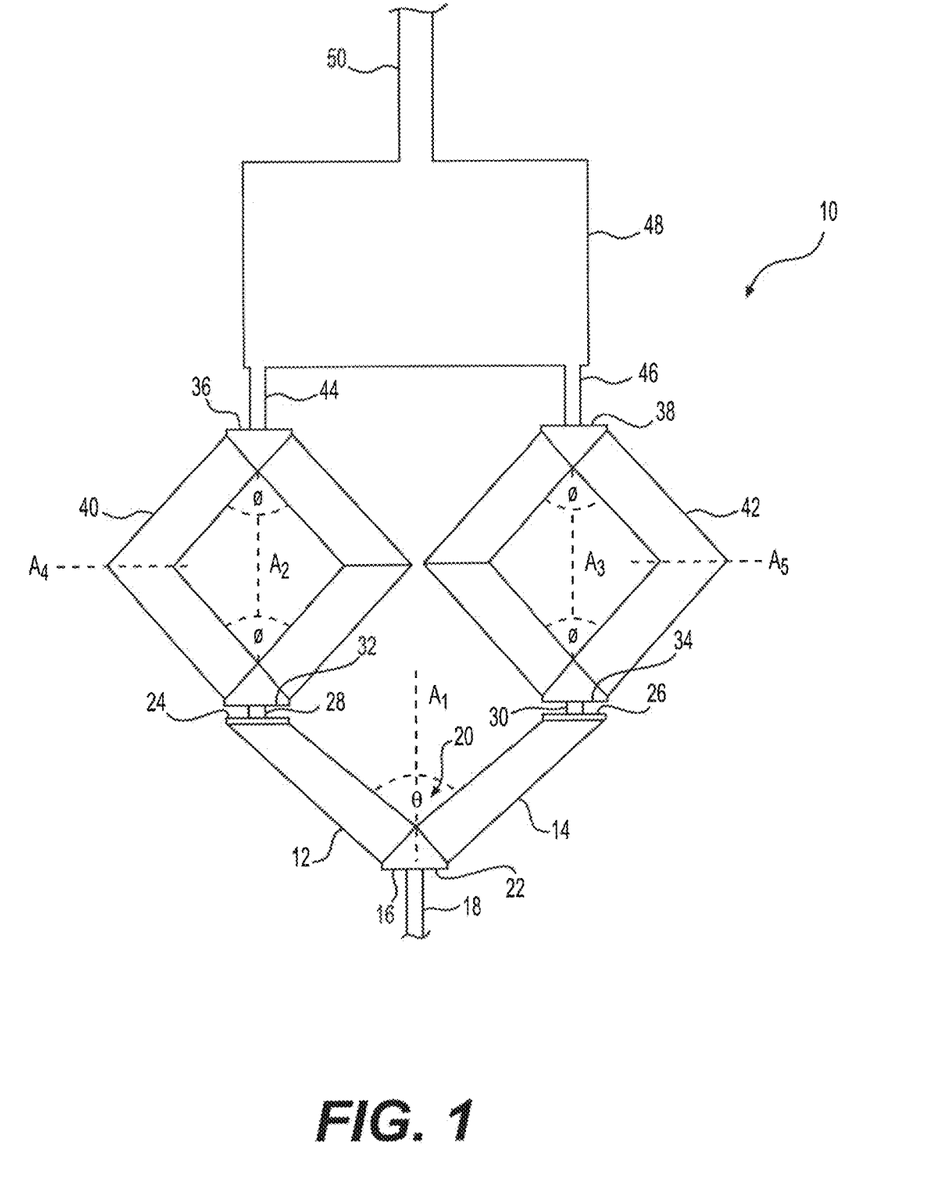
FIG. 1 diagrammatically illustrates a planar waveguide converter.

As shown in FIG. 1, in the initial stage, the V-shaped, graded-index mode slicer of the planar waveguide converter 10 is formed from first and second optically transmissive branches 12, 14, respectively, which share a common optically transmissive base 16. The first and second optically transmissive branches 12, 14 each define an optical waveguide, and are symmetrical about a central longitudinal axis $A_1$. The first and second optically transmissive branches 12, 14 each have inner sides angled with respect to the central longitudinal axis $A_1$ and intersecting at a vertex 20 positioned along the central longitudinal axis $A_1$. In a non-limiting example, first and second optically transmissive branches 12, 14 are angularly separated by an angle θ of approximately 40°.

The optically transmissive base 16 has a laterally extending input surface 22 which is longitudinally opposed from the vertex 20, and each of the first and second optically transmissive branches 12, 14 has a laterally extending output surface 24, 26, respectively, which is parallel to, and longitudinally opposed to, the laterally extending input surface 22 of the base 16. The laterally extending input surface 22 of the base 16 is adapted for optical connection to the single-mode waveguide 18 for receiving the input single-mode signal. As a non-limiting example, the single-mode waveguide 18 may have a width of approximately 6 μm, and each of the first and second optically transmissive branches 12, 14 may have a width of approximately 35 μm. The initial stage converts the single-mode waveguide (1M-WG) input into two-mode (2M) waveguides, thus slicing the input fundamental mode (TE0) into two equal-power fundamental modes (TE0).

Each of the first and second optically transmissive branches 12, 14 is a parabolic, graded-index planar waveguide having a maximum refractive index along a central axis of the branch. The input signal is split within the graded-index vertex area of the optically transmissive base 16, such that the signal is split by an overlap between respective numerical apertures of the first and second optically transmissive branches 12, 14. The parabolic, graded-index planar waveguide defining each of the first and second optically transmissive branches 12, 14 ensures confined beam propagation therein, and also provides for direct mode matching to respective outputs of the laterally extending output surfaces. Corresponding to the above exemplary dimensions, the separation between output surfaces 24, 26 is approximately 168 µm.

The intermediate stage is formed from first and second quadrilateral or diamond-shaped phase shifters 40, 42, respectively. First quadrilateral phase shifter 40 has a laterally extending input face 32 and a laterally extending output face 36. The laterally extending input face 32 of the first quadrilateral phase shifter 40 is in optical communication with the laterally extending output surface 24 of the first optically transmissive branch 12. Similarly, second quadrilateral phase shifter 42 has a laterally extending input face 34 and a laterally extending output face 38. The laterally extending input face 34 of the second quadrilateral phase shifter 42 is in optical communication with the laterally extending output surface 26 of the second optically transmissive branch 14. The laterally extending input face 32 of the first quadrilateral phase shifter 40 optically communicates with the laterally extending output surface 24 of the first optically transmissive branch 12 through a first two-mode waveguide 28 and, similarly, the laterally extending input face 34 of the second quadrilateral phase shifter 42 optically communicates with the laterally extending output surface 26 of the second optically transmissive branch 14 through a second two-mode waveguide 30.

As shown in FIG. 1, each of the first and second quadrilateral phase shifters 40, 42 is formed from first and second bent-angled optically transmissive branches. The first and second bent-angled optically transmissive branches of first quadrilateral phase shifter 40 are symmetrical about a central longitudinal axis $A_2$ and are also symmetrical about a central lateral axis $A_4$, as shown. The bent-angled optically transmissive branches are angled, with respect to one another, and about the central longitudinal axis $A_2$, by an angle $\emptyset$ which, as a non-limiting example, may be approximately 30°. Corresponding to the exemplary dimensions given above, each of the first and second bent-angled optically transmissive branches of first quadrilateral phase shifter 40 may have a width of approximately 35 µm. Similarly, the first and second bent-angled optically transmissive branches of second quadrilateral phase shifter 42 are symmetrical about a central longitudinal axis $A_3$ and are also symmetrical about a central lateral axis $A_5$, as shown. The bent-angled optically transmissive branches are angled, with respect to one another, and about the central longitudinal axis $A_3$, by an identical angle $\emptyset$ which, as a non-limiting example, may be approximately 30°. Corresponding to the exemplary dimensions given above, each of the first and second bent-angled optically transmissive branches of second quadrilateral phase shifter 42 may have a width of approximately 35 µm. Each of the bent-angled optically transmissive branches of first and second quadrilateral phase shifters 40, 42 may have an exemplary waveguide length of approximately 4.4 µm.

Each of the first and second bent-angled optically transmissive branches of each of the first and second quadrilateral phase shifters 40, 42 is a parabolic, graded-index planar waveguide having a maximum refractive index along a central path of the respective bent-angled optically transmissive branch, similar to that described above with respect to first and second optically transmissive branches 12, 14. The intermediate stage has two input two-mode waveguides (2M-WGs) 28, 30 and also two output 2M-WGs 44, 46. The intermediate stage slices each input 2M-WG fundamental mode into two equal-power halves in order to provide four equal-power quarters for the original input single-mode. However, each quarter has its own original phase. The intermediate stage re-adjusts the phase differences among different quarters by introducing appropriate π radian phase shifts among them. Then, the intermediate stage re-combines each two quarters to selectively excite the desired mode (TE0 or TE1) into the output 2M-WGs 44, 46.

The final stage is formed from an M-shaped, graded-index mode combiner 48, which has an input surface and an output surface. The input surface of the graded-index mode combiner 48 is in optical communication with the laterally extending output face 36 and the laterally extending output face 38 of first and second quadrilateral phase shifters 40, 42, respectively. As shown in FIG. 1, two-mode waveguides 44, 46 may be provided for respective communication between laterally extending output faces 36, 38 and the input surface of the M-shaped, graded-index mode combiner 48. The output surface of the graded-index mode combiner 48 is adapted for optical connection to a multiple-mode waveguide 50 for transmission of the output three or four-mode signal. Corresponding to the above exemplary dimensions, two-mode waveguides 44, 46 may each have a width of approximately 9 µm, and M-shaped, graded-index mode combiner 48 may have a waveguide length of approximately 370 µm. Corresponding to the exemplary dimensions given above, multiple-mode waveguide 50 may have a width of approximately 15 µm for a three-mode signal, and may have a width of approximately 20 µm for a four-mode signal.

The final stage recombines the two input modes coming from the two input 2M-WGs 44, 46 in order to selectively excite the desired mode (TE0, TE1 or TE2) in the output three-mode waveguide (3M-WG) 50, or the desired mode (TE0, TE1, TE2, or TE3) for output to four-mode waveguide (4M-WG) 50.

Figure 2:
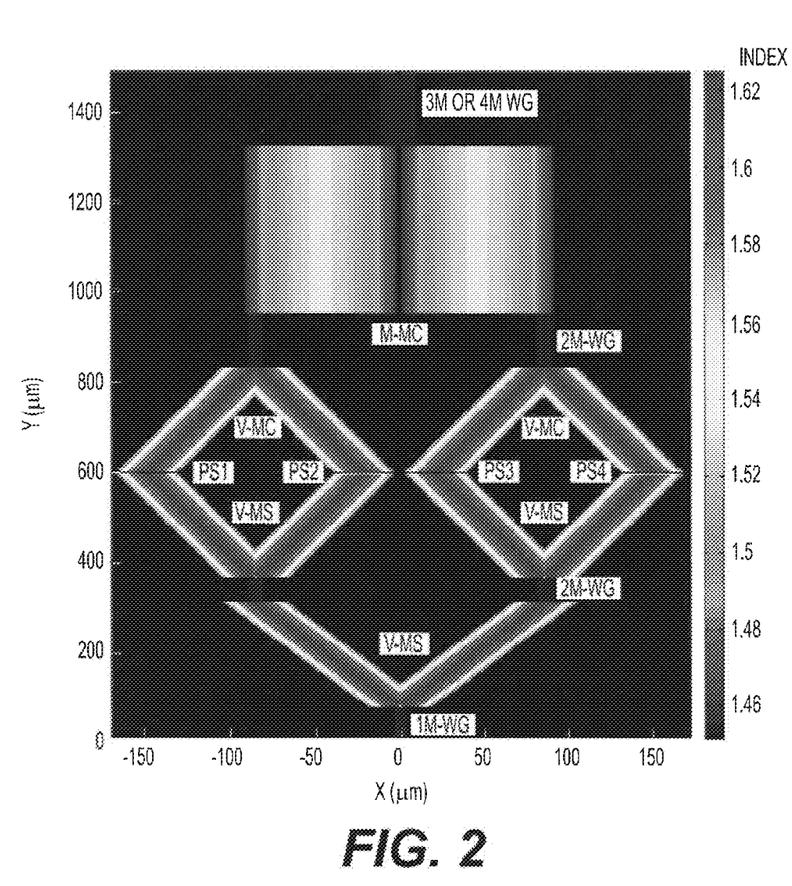
FIG. 2 illustrates refractive index distribution in the planar waveguide converter.

FIG. 2 shows the refractive-index distribution of planar waveguide converter 10. Each of the 1M-WG 18, and the 2M-WGs 28, 30, 44, 46 may have a core refractive index, $n_c$, of approximately 1.4551. Each of first and second optically transmissive branches 12, 14, and each of the bent-angled branches of first and second quadrilateral phase shifters 40, 42, has a parabolic graded-index (GI) distribution spanning the respective waveguide width, with a peak refractive index, $n_o$, at the axial center of each branch. For a distance $d$ from the axial center of each branch, the parabolic, graded refractive index, $n(d)$, for each branch is given by:

$$n(d) = n_o\left(1 - \frac{1}{2}\alpha^2 d^2\right), \tag{1}$$

where the peak refractive index, $n_o$ for the exemplary figures given above is 1.63, and $\alpha = 3.1 \times 10^{-2}$ m$^{-1}$. The input and output core tips are designed to have conical shapes with an apex-angle of 164° in order to reduce the induced back-reflections at the interface between input/output cores and the graded-index (GI) waveguides. The back-reflections mainly result from the relatively large index difference between the V-shaped waveguides and the cores. The input 1M-WG fundamental mode experiences a symmetric overlapping area between the numerical apertures (NAs) of the tilted waveguides (WGs). Thus, the mode is sliced in half, and each half propagates into a single WG. Each branch numerical aperture, NA, can be expressed as:

$$NA = n_c \sin \theta_a \cong \frac{n_0 \alpha W}{2} \quad (2)$$

where $\theta_a$ is the acceptance angle of the input from 1M-WG 16. The calculated acceptance angle from equation (2) is 28.41°. The angle-tilted branches 12, 14 allow for oblique incidence of each split signal at 20° with respect to each branch central axis. Thus, the input signal falls within the overlapping area between the numerical apertures of the two branches 12, 14, and its power is split in two equal halves between branches 12, 14. Each split beam deflects by double the tilting angle≅2×20°=40° (measured with respect to input axis $A_1$) after the first total internal reflection (TIR) on the branch sidewall. Then, each deflected beam propagates inside one branch and hits the other sidewall to deflect again by a second TIR at ≅−40° before it emerges from the branch output, parallel to the input beam direction. The sliced mode beam is launched at the center of output 2M-WG 28, 30 to ensure excitation of its fundamental mode. The choice of the above device profile parameters and tilt-angles are made to provide splitting and deflections within a relatively short distance without much radiation loss into the cladding of each waveguide. The choice of the parabolic GI profile results in a confined beam propagation throughout the waveguides without excitation of higher-order modes, thus ensuring direct fundamental mode-matching at the output two-mode cores.

Each of the first and second quadrilateral phase shifters 40, 42 may be considered as a combined mode slicer and mode combiner. With reference to the orientation of FIG. 1, the V-shaped section beneath axis $A_4$ of first quadrilateral phase shifter 40 acts as a V-shaped mode slicer (MS), similar to the initial stage described above. The inverted V-shaped section above axis $A_4$ of first quadrilateral phase shifter 40 acts as a V-shaped mode combiner (MC). As noted above, the V-shaped MS and the V-shaped MC are symmetrical about axis $A_4$ and, further, second quadrilateral phase shifter 42 acts in an identical manner. Each of the V-shaped MS portions (V-MS) operates identically to that of the first stage, except that the tilting angles are each 15° about their respective central longitudinal axes (i.e., a total angular span Ø of 30°), as described in the non-limiting example described above. It should be understood that the tilting angles are selected according to equation (1) to be less than $\theta_a$. However, the 15° tilting angle is chosen to be small enough to ensure that the parallel first and second quadrilateral phase shifters 40, 42 come side by side with a center-to-center separation of approximately 168 μm (i.e., equal to the separation of the 2M-WGs 28, 30 from the initial stage). The 15° tilting angles also allow for a safety margin separation between quadrilateral edges of approximately 10 μm in order to overcome possible fabrication errors. In addition, the 15° tilting angle is still large enough to reduce the overall second stage length of approximately 460 μm.

As noted above, each V-MS is followed by a V-shaped mode combiner (V-MC) in order to re-combine the four single-beam quarters prior to output to the 2M-WGs 44, 46. The two V-MC combiners operate and have configurations identical to the corresponding V-MSs, except that they work in the reverse direction. Thus, each V-MC can recombine two input beams into one output beam. The lengths of each V-MS and V-MC are optimized to ensure that deflected beams come back by total internal reflection (TIR) parallel to the input beams, as well as providing a best-match for the modes of output 2M-WGs 44, 46 in order to minimize insertion loss. As indicated in FIG. 2, there are four phase shifters (PS1-PS4) placed in between the V-MS and V-MC in order to modify the relative phase differences among the four quarter beams before recombination. Thus, each two recombined beams can selectively excite the desired mode in each output 2M-WG. The phase-shifters (PSs) are designed to introduce either 0 or π radian phase shifts for each propagating quarter mode in order to re-adjust the relative phase differences among quarters, and thus excite the desired output mode. The phase shifter operation is governed according to:

$$\Delta\phi = \frac{2\pi L \Delta n}{\lambda_0}. \quad (3)$$

All of the phase shifters have the same length, L, of approximately 4.4 μm. The phase shift ($\Delta\phi$) is adjusted by selecting the refractive index of the phase shifter to be either 1.63 for a zero phase shift (i.e., equal to GI peak value), or 1.4551 for a π phase shift. Therefore, for ($\Delta\phi=\pi$), the refractive index difference is $\Delta n=1.63-1.4551=0.1749$. In equation (3), $\lambda_0$ represents the propagating light wavelength, where the phase shifters are designed to operate in the C-band range (i.e., $\lambda_0=1.53$ to 1.565 μm). Due to different wavelength values across the C-band, there could be a possible deviation in selected values of $\Delta\phi$. This $\Delta\phi$ is found to be on the order of ±1.1%, which is considered small and does not affect the device performance, as will be discussed in greater detail below. Further, according to equation (3), a deviation in refractive index difference $\Delta n$ between phase shifters (i.e., a possible index mismatch) of approximately ±0.0019, for example, can result in a corresponding acceptable deviation in $\Delta\phi$ of approximately ±1.1%. However, it should be noted that using thermo-optic thin film heaters, one could fine tune the selected static phases in order to achieve accurate phase differences among sliced mode quarters or, alternatively, switch the refractive index in order to achieve dynamic phase shifters.

The third stage consists of the M-shaped mode combiner (M-MC) 48. The M-shaped graded-index profile consists of two parabolas, side-by-side, with a minimum index value almost equal to the device cladding index. The minima are located at the middle and boundaries of the M-MC waveguide, thus forming an M-shape across the waveguide's entire width. The waveguide average width ($W_M$) is approximately 179 μm, and its length ($L_M$) is approximately 370 μm. According to equation (1), each parabolic profile has a peak index value $n_0$ of 1.535 and $\alpha_M=8.5\times10^{-3}$ μm$^{-1}$. It should be noted that the M-shape might be viewed as a special case of the V-shape with a zero apex angle, thus resembling one large planar waveguide.

The third stage receives the two input modes from the second stage and recombines them together into one output mode in either 3M or 4M-WG. The separation between the third stage input 2M-WGs 44, 46 is already set by the previous stage at approximately 168 µm. The selected output 3M-WG and 4M-WG core widths are 15 µm and 20 µm, respectively, and they are positioned at the M-shape profile center. Each input beam is deflected by TIR twice at the boundaries of each parabolic GI profile while propagating toward the output waveguide, as shown in FIGS. 3A-3D. In the case of 4M-WG, it is found that the best M-MC width (W) to excite even modes (TE0 and TE2) in the output waveguide is 178 µm, while the best width to excite the odd modes (TE1 and TE3) is 182 µm. In the case of 3M-WG, the best M-MC width to excite the even modes (TE0 and TE2) in the output waveguide is 177 µm, while the best width to excite the odd mode TE1 is 180 µm. This is because the odd mode distributions inside the output of a few-mode waveguide are usually shifted laterally by a few microns with respect to the even modes. The M-MC widths and lengths are selected and optimized to minimize the insertion loss of desired excited modes as well as to minimize its cross-talk with other undesirable excited modes. The M-shaped GI profile is found to be more appropriate than the V-shape profile for combining TE1 modes (or slicing higher-order modes into the TE1 mode) because TE1 propagates as two side-by-side parallel beams, thus the M-shape preserves the TE1 beam's parallelism as well as separation at the waveguide output; i.e., it does not introduce distortion.

Figure 3A:
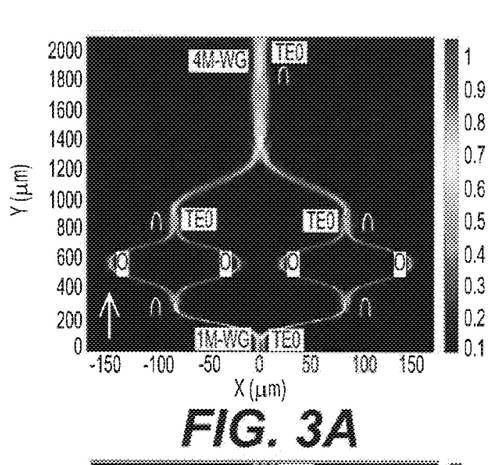
FIGS. 3A, 3B, 3C and 3D show two-dimensional cross-sections of three-dimensional simulations for excitation of first, second, third and fourth order modes, respectively, in the planar waveguide converter, particularly for a four-mode output.
Figure 3B:
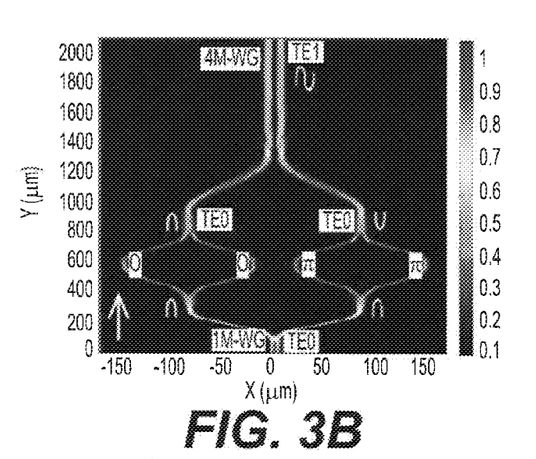
Figure 3C:
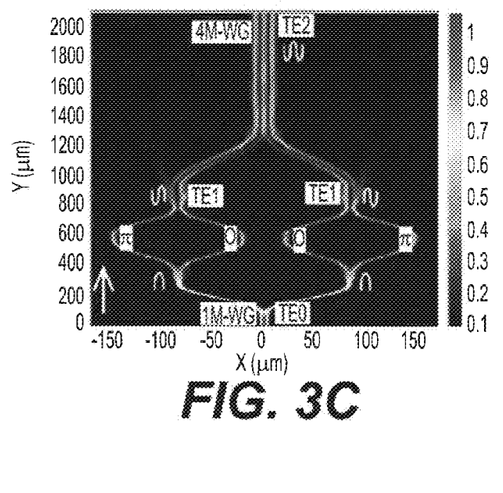
Figure 3D:
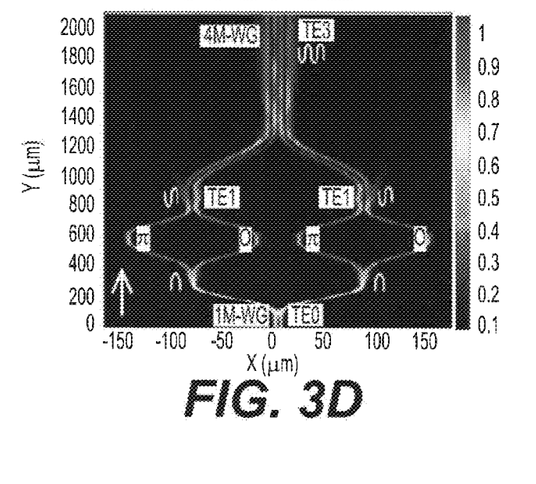

FIGS. 3A-3D and FIGS. 4A-4O show three-dimensional (3D) finite difference time domain (FDTD) simulations of the device's electric fields in arbitrary units (a.u.). FIGS. 3A-3D and FIGS. 4A-4O illustrate the conversion from 1M-WG to 4M-WG with selective mode excitations at an operating wavelength of 1550 nm. FIGS. 3A-3D show the two-dimensional (2D) cross-sections (X-Y directions) of the 3D simulations for excitation of 1st (fundamental), 2nd, 3rd, and 4th order modes, respectively, in the 4M-WG. The input fundamental mode of 1M-WG is propagating in the forward direction along the positive Y-direction. Every change in the confined beam propagation direction (i.e., beam deflections) indicates a TIR inside the V-shaped or M-shaped GI waveguides. The white sinusoidal sketches illustrate the different propagating mode shapes. The phase difference between peaks and troughs is π radians. The introduced phase difference (0 or π radians) in each path is indicated based on each phase shifter adjustment, in order to selectively excite the desired mode in the output few-modes waveguide. As clearly shown, the WGC slices the fundamental mode of the input single-mode waveguide twice, in two steps, to get four equal-power quarters. The relative phase differences among quarters are re-adjusted to synthesize one of the desired output waveguide modes. Then, the four quarters are recombined, in two steps, to excite the output target mode. In order to excite the TE2 or TE3 modes in the output waveguide, the two TE1 modes out of the second stage are combined, as shown in FIGS. 3C and 3D. However, each TE1 mode looks like two parallel propagating beams, side-by-side. In order for TE1 modes to excite TE3 or TE4 at proper locations inside the output waveguide, it is mandatory to gently deflect the TE1 dual-beams by TIRs without distorting their parallelism. This is why an M-shaped mode combiner (M-MC) is used instead of a V-shaped combiner (V-MC) in the third stage. The M-MC graded index profile has a gentle parabolic slope (i.e., small $\alpha_M$) and thus a wide mode combiner waveguide width.

Figure 4A:
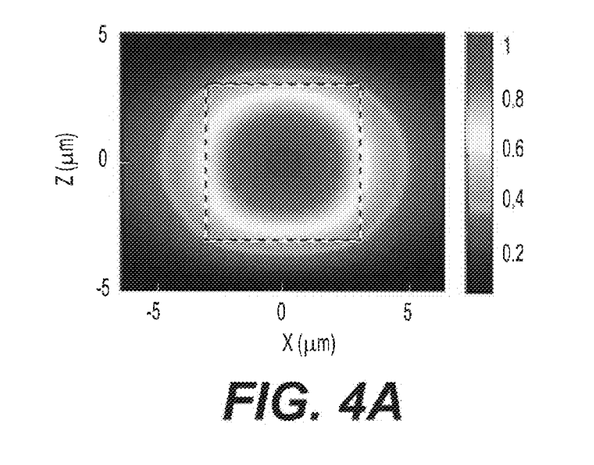
FIGS. 4A, 4B, 4C, 4D, 4E, 4F, 4G, 4H, 4I, 4J, 4K, 4L, 4M, 4N and 4O show two-dimensional cross-sections of three-dimensional simulations for propagating mode profiles inside waveguides of the planar waveguide converter, respectively showing a step-by-step evolution of mode profiles along the propagation direction of a signal being converted by the planar waveguide converter.
Figure 4B:
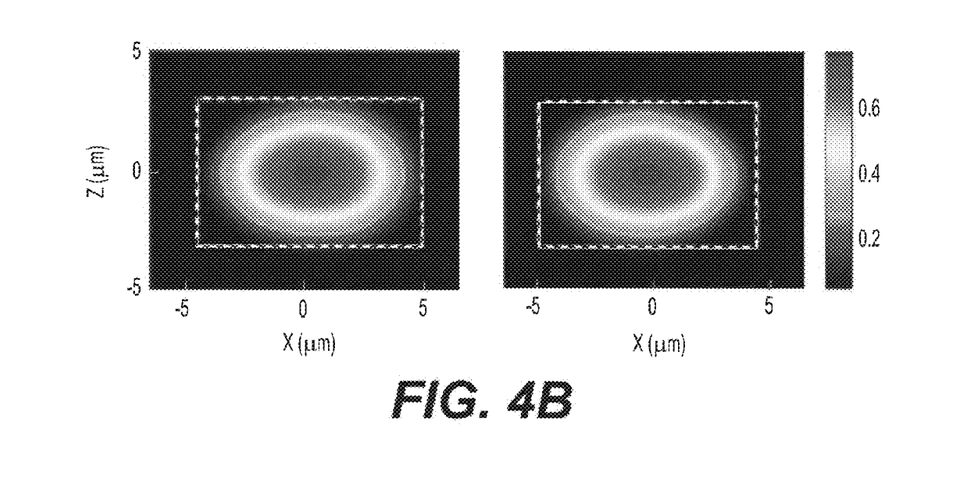
Figure 4C:
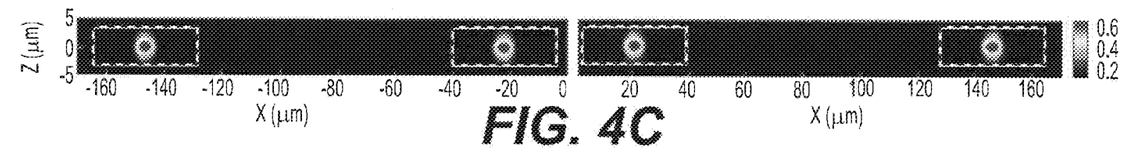
Figure 4D:
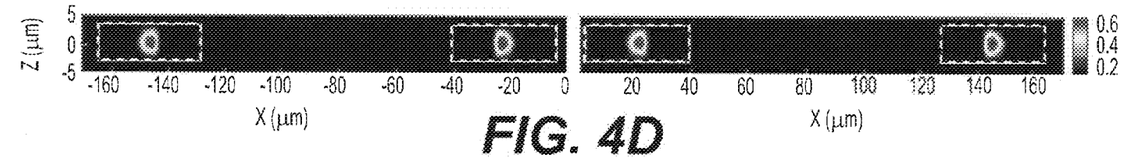
Figure 4E:
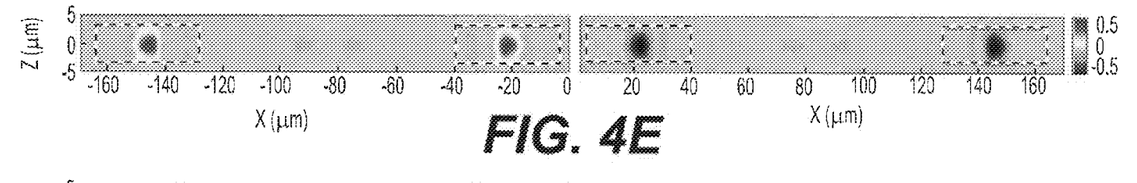
Figure 4F:
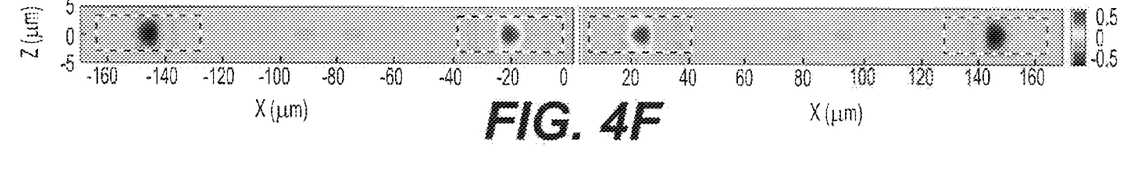
Figure 4G:
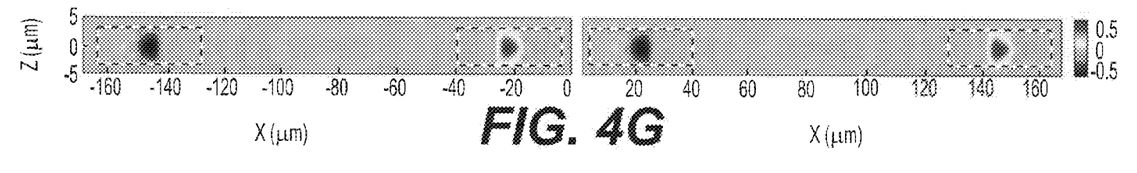
Figure 4H:
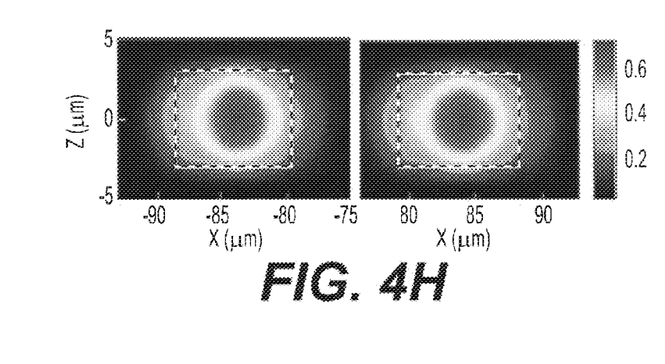
Figure 4I:
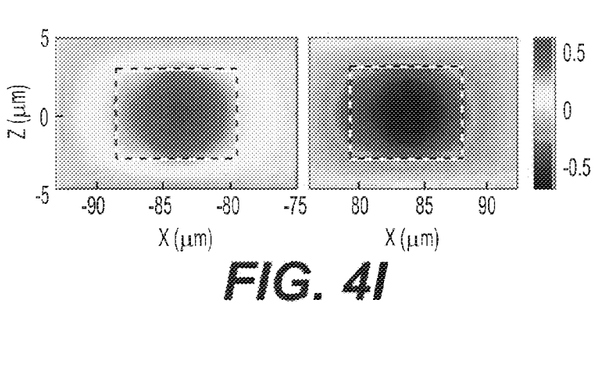
Figure 4J:
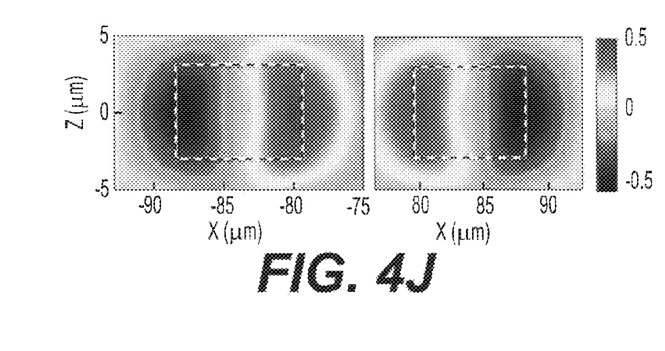
Figure 4K:
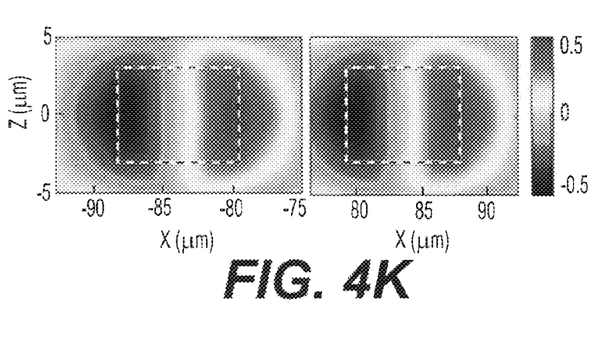
Figure 4L:
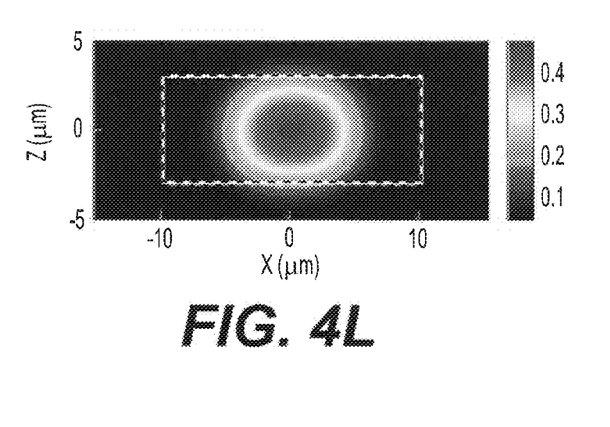
Figure 4M:
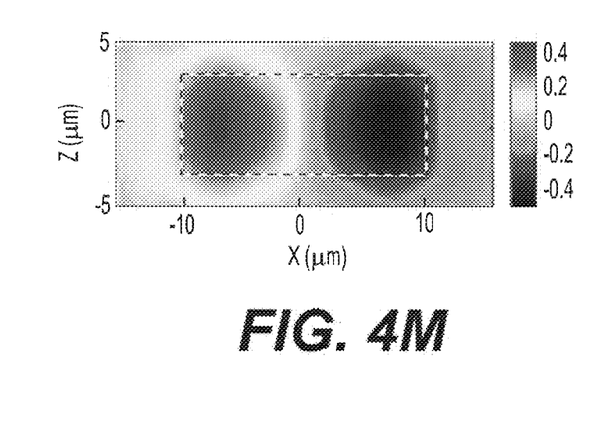
Figure 4N:
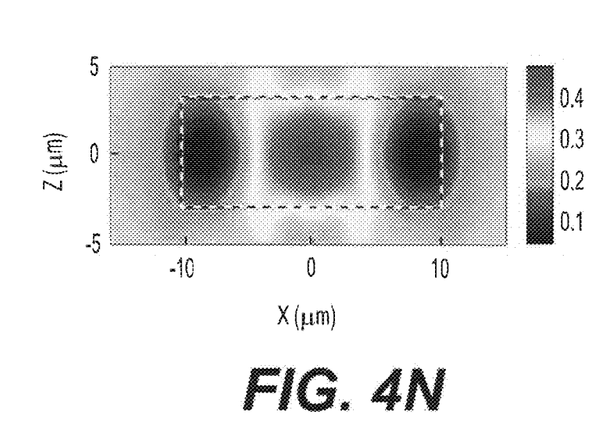
Figure 4O:
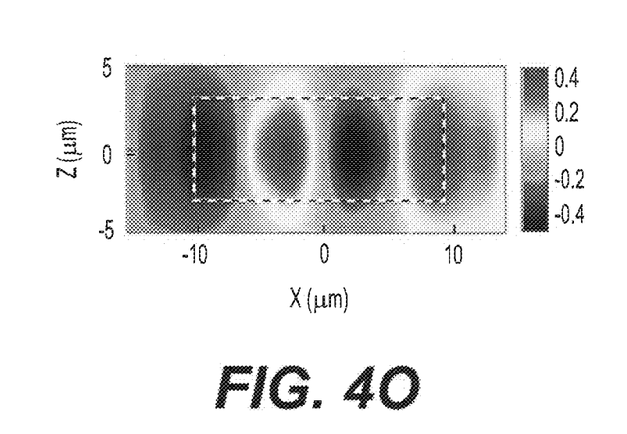
Figure 5A:
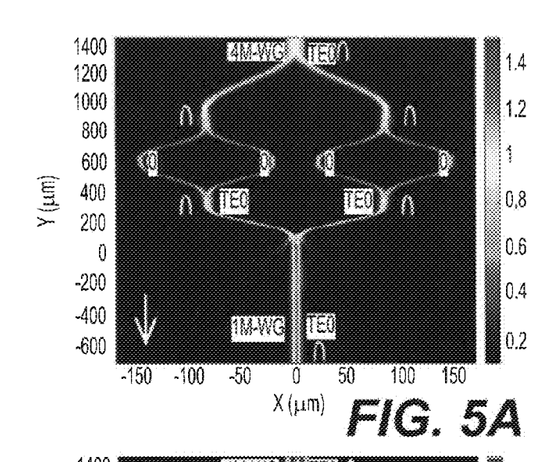
FIGS. 5A, 5B, 5C and 5D show electric field magnitudes of the three-dimensional simulations for the first, second, third and fourth order modes, respectively, in the planar waveguide converter, particularly for conversion from a four-mode input to a single-mode output.
Figure 5B:
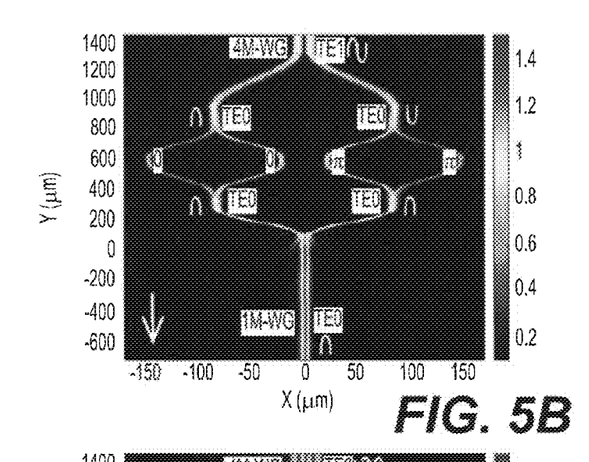
Figure 5C:
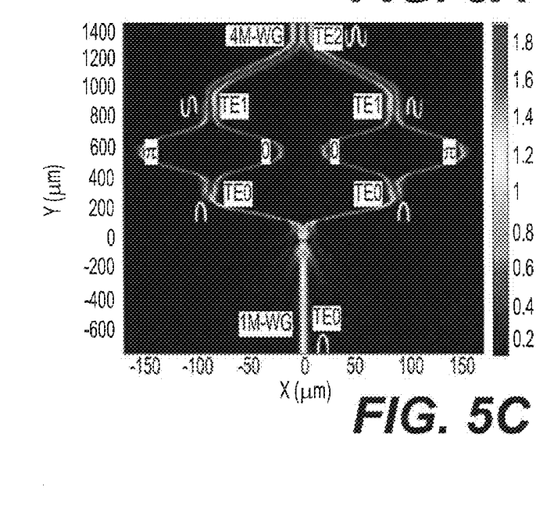
Figure 5D:
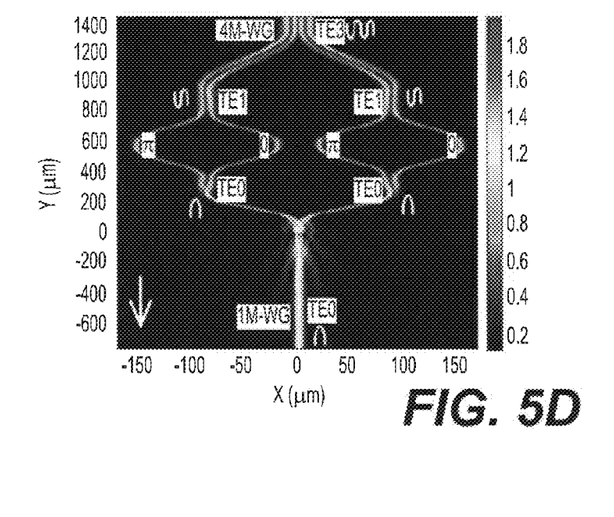

FIGS. 4A-4O show the two-dimensional cross-sections (X-Z directions) of the 3D simulations for propagating mode profiles inside the waveguides at some selected critical locations of different stages. FIGS. 4A-4O illustrate a step-by-step evolution of mode profiles along the propagation direction. The selected case for illustration is a conversion from 1M-WG to 4M-WG in the forward direction, similar to the case in FIGS. 3A-3D. The mode profile electric fields are represented in a.u. The dashed rectangles indicate the boundaries between waveguide cores and cladding. FIGS. 4A and 4B illustrate the TE0 mode profiles at the 1M-WG input and two 2M-WG outputs of the first stage. FIG. 4C illustrates the cross-sections of the left and right quadrilateral phase shifters 40, 42, just prior to phase shifting. These cross-sections show TE0 modes, and they are applicable to all cases of conversion. FIGS. 4D, 4E, 4F and 4G illustrate the cross-sections of the left and right quadrilateral phase shifters 40, 42 just after phase shifting. They correspond to conversion to output the TE0, TE1, TE2, and TE3 modes, respectively. FIGS. 4H, 4I, 4J and 4K illustrate TE0 and TE1 mode profiles at the output 2M-WGs of the second stage, corresponding to conversions to output TE0, TE1, TE2, and TE3 modes, respectively. FIGS. 4L, 4M, 4N and 4O illustrate mode profiles at the output 4M-WG of the third stage for the cases of conversions to TE0, TE1, TE2, and TE3 modes, respectively.

FIGS. 5A-5D show the conversion in the reverse direction, from a 4M-WG input to a 1M-WG output (i.e., the fundamental mode) at an operating wavelength of 1550 nm. FIGS. 5A-5D show the two-dimensional cross-sections (in the X-Y directions) of the three-dimensional simulations for the cases of input 1st (fundamental), 2nd, 3rd and 4th order modes, respectively. Here, the M-shaped GI profile of the M-MS is suitable to slice input TE2 or TE3 modes into two TE1 modes, each propagating like two parallel beams, without introducing distortions to the mode shape. The TE1 modes are sliced again to obtain four equal-power quarters, then their relative phase differences are re-adjusted before recombining them again to excite the fundamental mode in the output 1M-WG.

In order to assess the waveguide converter performance, the 3D FDTD simulations were performed over the C-band, covering a wavelength range from 1.53 µm up to 1.565 µm. The device performance parameters were insertion loss (IL), polarization-dependent loss (PDL), return loss (RL), cross talk (XT), and the mode rejection ratio (MRR).

Figure 6A:
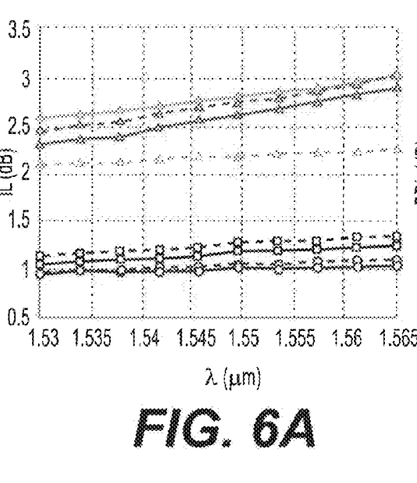
FIG. 6A is a graph showing insertion loss over the C-band for the planar waveguide converter, particularly in the case of conversion from a single-mode input to a four-mode output.
Figure 6B:
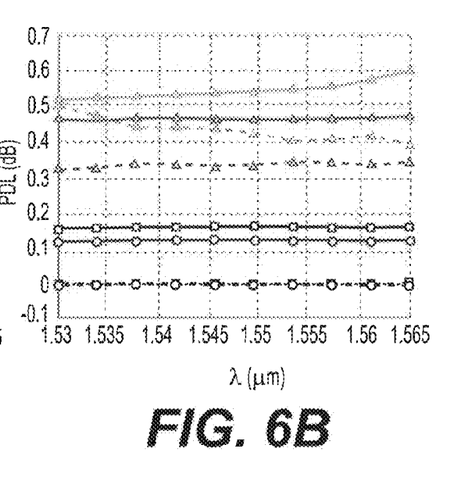
FIG. 6B is a graph showing polarization-dependent loss over the C-band for the planar waveguide converter, particularly in the case of conversion from a single-mode input to a four-mode output.
Figure 6C:
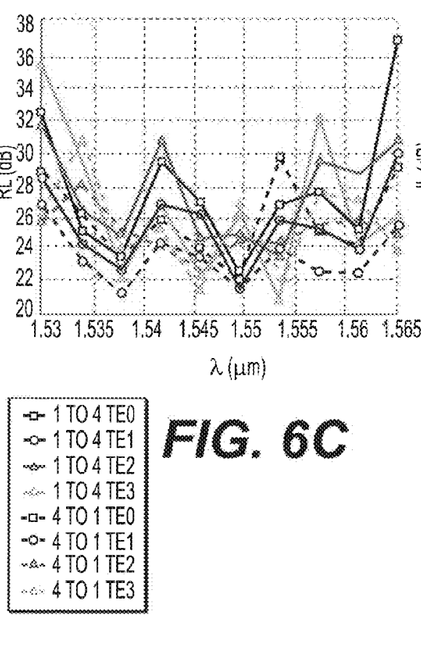
FIG. 6C is a graph showing return loss over the C-band for the planar waveguide converter, particularly in the case of conversion from a single-mode input to a four-mode output.

FIGS. 6A-6C show the performance of 1M-WG to 4M-WG WGC in bidirectional directions. The curves' legends are shown in FIG. 6C. FIG. 6A shows the IL for each excited mode in either output 4M-WG or 1M-WG. The worst case insertion loss is approximately 3 dB, which is considered reasonable. The IL for TE2 and TE3 are higher than those for TE0 and TE1 because the former mandates excitation of the TE1 mode, while the latter mandates excitation of the TE0 mode in the 2M-WGs of the second stage, respectively. The TE1 mode in 2M-WGs suffers more radiation loss during excitation than TE0 because it has more mode field width. FIG. 6B shows the PDL for each excited mode in either output 4M-WG or 1M-WG. The TE and TM polarizations are excited separately in the input waveguide, while the output insertion loss is estimated for each output excited mode in order to calculate the IL difference. The worst case PDL is approximately 0.6 dB, which is also considered to be reasonable. FIG. 6C shows the RL for each excited mode in either output 4M-WG or 1M-WG. The worst case return loss is approximately 21 dB at the wavelength of 1553 nm, which is also considered reasonable.

Figure 6D:
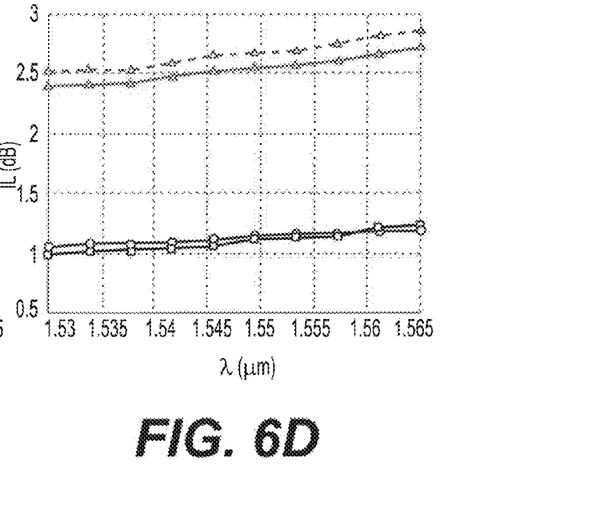
FIG. 6D is a graph showing insertion loss over the C-band for the planar waveguide converter, particularly in the case of conversion from a single-mode input to a three-mode output.
Figure 6E:
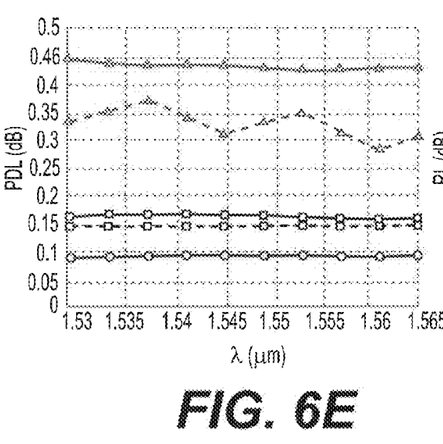
FIG. 6E is a graph showing polarization-dependent loss over the C-band for the planar waveguide converter, particularly in the case of conversion from a single-mode input to a three-mode output.
Figure 6F:
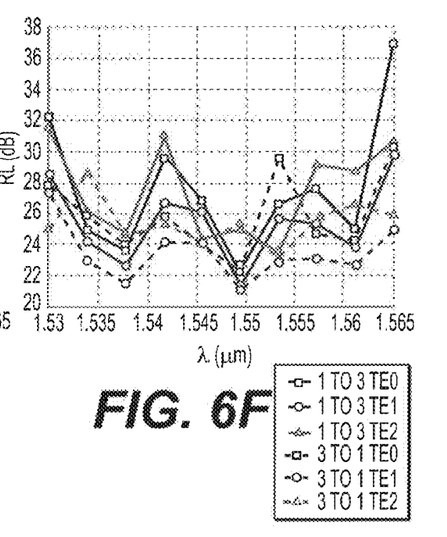
FIG. 6F is a graph showing return loss over the C-band for the planar waveguide converter, particularly in the case of conversion from a single-mode input to a three-mode output.
Figure 7A:
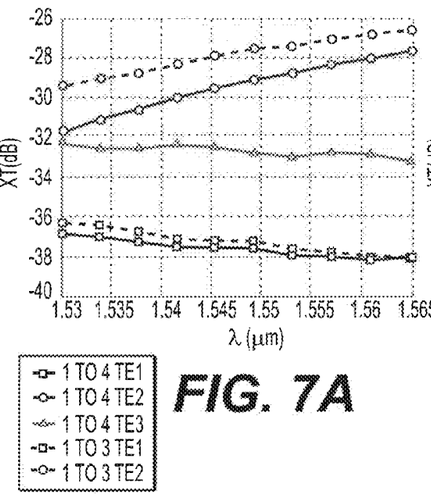
FIG. 7A is a graph showing estimated cross-talk (XT) over the C-band for the planar waveguide converter, particularly for a desired target mode of the fundamental transverse electric field mode (TE0).
Figure 7B:
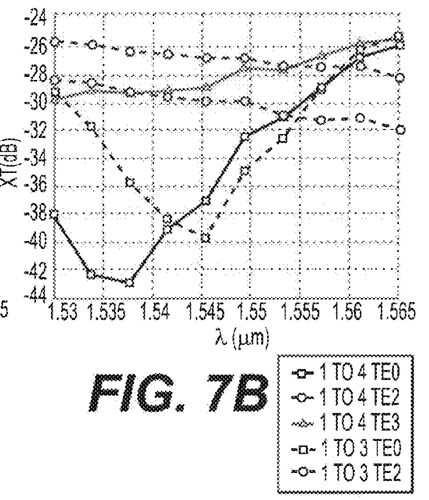
FIG. 7B is a graph showing estimated cross-talk (XT) over the C-band for the planar waveguide converter, particularly for a desired target mode of the first transverse electric field mode (TE1).
Figure 7C:
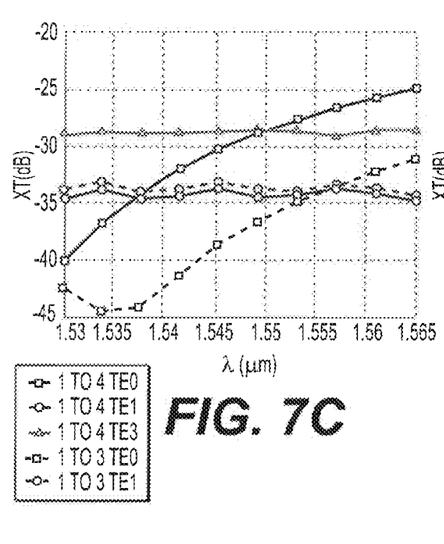
FIG. 7C is a graph showing estimated cross-talk (XT) over the C-band for the planar waveguide converter, particularly for a desired target mode of the second transverse electric field mode (TE2).
Figure 7D:
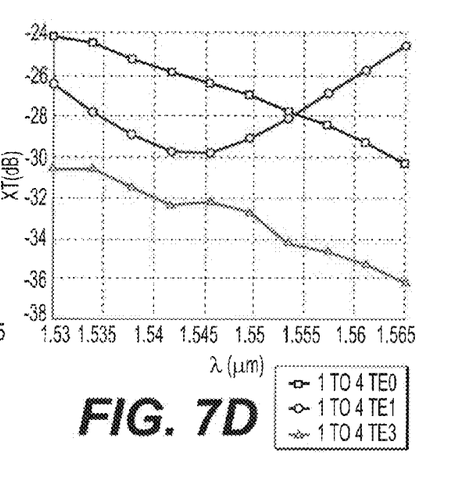
FIG. 7D is a graph showing estimated cross-talk (XT) over the C-band for the planar waveguide converter, particularly for a desired target mode of the third transverse electric field mode (TE3).

FIGS. 6D-6F show the performance of 1M-WG to 3M-WG WGC in bidirectional directions. The curves' legends are shown in FIG. 6F. FIG. 6D shows the IL for each excited mode in the output waveguide. The worst case insertion loss is approximately 2.7 dB. FIG. 6E shows the PDL) for each exited mode in the output waveguide. The worst case PDL is approximately 0.45 dB. FIG. 6F shows the RL for each excited mode in the output waveguide. The worst case return loss is approximately 21.3 dB at a wavelength of approximately 1550 nm, which is also considered reasonable. These performance parameter evaluations indicate that bidirectional operations of the WGC device with 3M-WG or 4M-WG have good performance.

FIGS. 7A-7D show the estimated cross-talk (XT) in dB between the desired excited modes and undesired excited modes, for the two cases of output 4M-WG and 3M-WG over the entire C-band. To measure the XT, the phase shifters of WGC are adjusted each time to selectively excite only one desired target mode in the output WG, then the insertion loss is measured for this excited mode as well as for undesirable (i.e., unavoidable) excited modes. The insertion loss of undesirable modes is considered a cross-talk due to cross-coupling with the excited desirable modes. The XT expresses how well the desired output mode is excited without excitation of other undesired modes in the output waveguide. For the 4M-WG case, the worst case XT across the C-band is found to be approximately −24.1 dB for the undesirable TE0 mode when the desired excited mode is TE3, which is considered reasonable. The worst case XT usually takes place between the excited even modes or odd modes. This is because the excitation of even modes requires the same width of the M-MC (178 µm), while excitation of the odd modes requires another width of the M-MC waveguide (182 µm). It is found that to minimize XT between even modes, it is better to excite TE0 at the zero cross-over locations of the TE2 mode. However, to minimize XT between odd modes, it is better to excite TE1 at the zero cross-over locations of the TE3 mode. For the 3M-WG case, the worst case XT across the C-band is found to be approximately −25.5 dB for the undesirable TE2 mode when the desired excited mode is TE1, which is also considered reasonable.

Figure 8A:
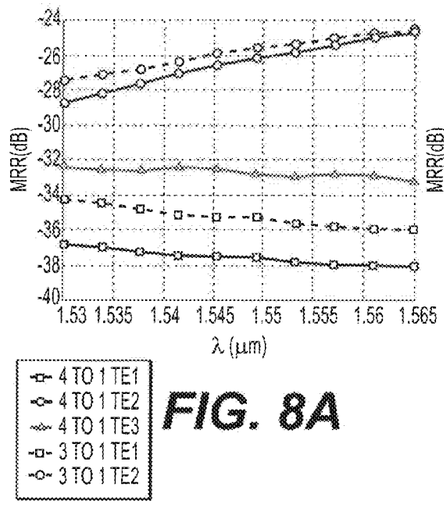
FIG. 8A is a graph showing the estimated mode rejection ratio (MRR) over the C-band for the planar waveguide converter, particularly for a desired target mode of the fundamental transverse electric field mode (TE0), and further converting from a multiple-mode input to a single-mode output.
Figure 8B:
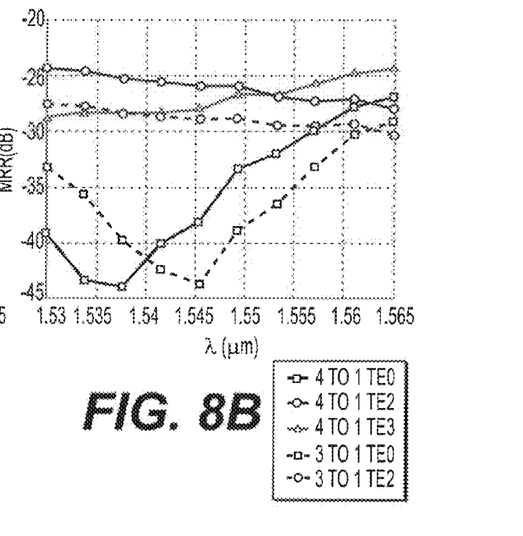
FIG. 8B is a graph showing the estimated mode rejection ratio (MRR) over the C-band for the planar waveguide converter, particularly for a desired target mode of the first transverse electric field mode (TE1), and further converting from a multiple-mode input to a single-mode output.
Figure 8C:
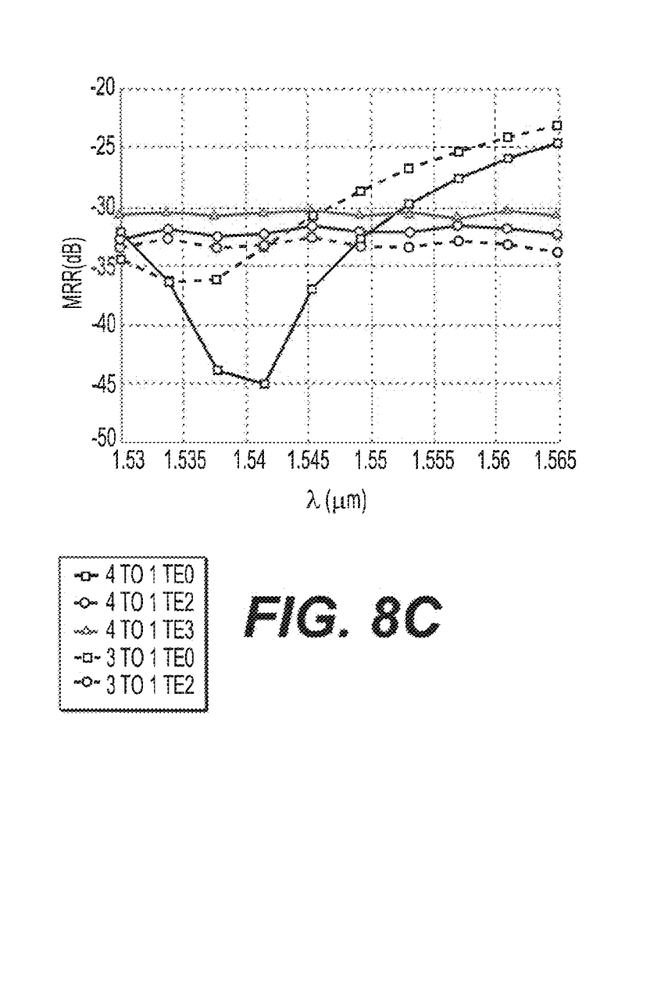
FIG. 8C is a graph showing the estimated mode rejection ratio (MRR) over the C-band for the planar waveguide converter, particularly for a desired target mode of the second transverse electric field mode (TE2), and further converting from a multiple-mode input to a single-mode output.
Figure 8D:
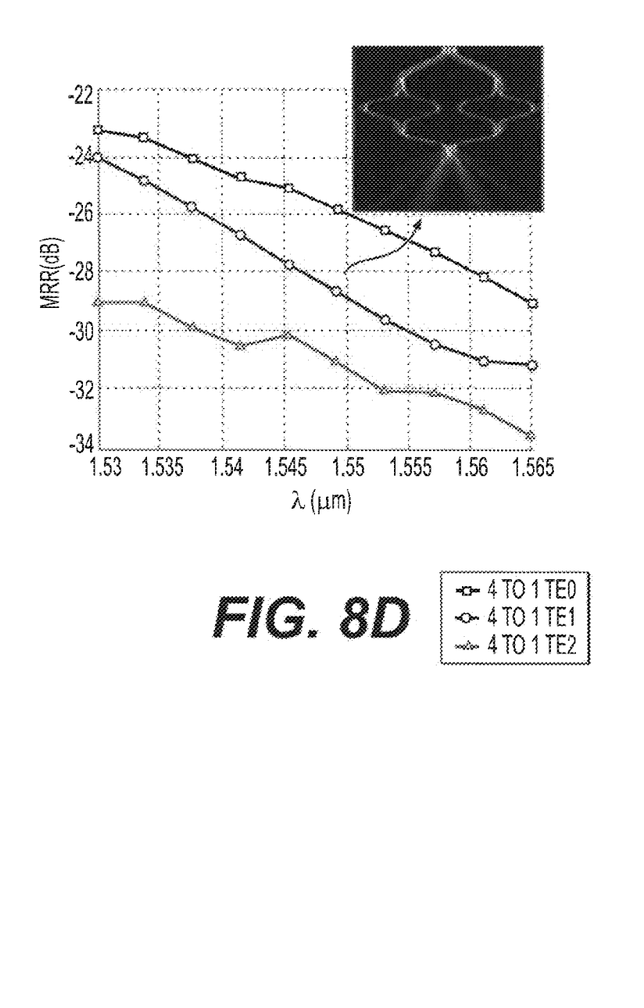
FIG. 8D is a graph showing the estimated mode rejection ratio (MRR) over the C-band for the planar waveguide converter, particularly for a desired target mode of the third transverse electric field mode (TE3), and further converting from a multiple-mode input to a single-mode output.

FIGS. 8A-8D show the estimated mode-rejection ratio (MRR) for conversion in the reverse direction, from input 4M-WG or 3M-WG modes to a 1M-WG output fundamental mode. The phase shifters of the WGC device are configured to selectively convert only one input desirable mode: TE0, TE1, TE2 and TE3 in FIGS. 8A, 8B, 8C and 8D, respectively. For each configuration, the input waveguide mode is changed while keeping the phase shifters fixed in order to estimate the MRRs of such modes at the output waveguide. The MRR is estimated as the insertion loss for each input mode at one selected device configuration. The MRR expresses how well the undesired input modes are rejected (i.e., not converted to output 1M-WG mode), if the device is configured to convert another desired mode. The inset in FIG. 8D shows an example of a 2D FDTD (X-Y directions) electric field at the wavelength of 1550 nm for input 4M-WG TE1 mode, when the device is configured for TE3 conversion.

The MRR, in this case, is approximately −28.8 dB, and the worst case MRR over the entire C-band is found to be approximately −23 dB at the wavelength of 1530 nm for an input 4M-WG TE0 mode when the device is configured for TE3 conversion, which is considered reasonable. For the 3M-WG case, the worst case MRR is found to be approximately −23 dB at the wavelength of 1560 nm for an input TE0 mode when the device is configured for TE2 conversion, which is also considered reasonable.

It is to be understood that the planar waveguide converter is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A planar waveguide converter, comprising:
   first and second optically transmissive branches sharing a common optically transmissive base, the first and second optically transmissive branches each defining an optical waveguide, the first and second optically transmissive branches being symmetrical about a central longitudinal axis, the first and second optically transmissive branches each having inner sides angled with respect to the central longitudinal axis and intersecting at a vertex positioned along the central longitudinal axis, the optically transmissive base having a laterally extending input surface longitudinally opposed from the vertex, each of the first and second optically transmissive branches having a laterally extending output surface parallel to and longitudinally opposed to the laterally extending input surface of the base, the laterally extending input surface of the base being adapted for optical connection to a single-mode waveguide;
   first and second quadrilateral phase shifters, each having a laterally extending input face and a laterally extending output face, the laterally extending input face of the first quadrilateral phase shifter being in optical communication with the laterally extending output surface of the first optically transmissive branch, and the laterally extending input face of the second quadrilateral phase shifter being in optical communication with the laterally extending output surface of the second optically transmissive branch; and
   a graded index mode combiner having an input surface and an output surface, the input surface of the graded index mode combiner being in optical communication with the laterally extending output face of each of the first and second quadrilateral phase shifters, the output surface of the graded index mode combiner being adapted for optical connection to a multiple-mode waveguide.

2. The planar waveguide converter as recited in claim 1, further comprising first and second two-mode waveguides, wherein the laterally extending input face of the first quadrilateral phase shifter optically communicates with the laterally extending output surface of the first optically transmissive branch through the first two-mode waveguide, and the laterally extending input face of the second quadrilateral phase shifter optically communicates with the laterally extending output surface of the second optically transmissive branch through the second two-mode waveguide.

3. The planar waveguide converter as recited in claim 1, wherein each of the first and second quadrilateral phase shifters comprise first and second bent-angled optically transmissive branches, the first and second bent-angled optically transmissive branches being symmetrical about a central longitudinal axis and further being symmetrical about a central lateral axis.

4. The planar waveguide converter as recited in claim 1, wherein each of the first and second optically transmissive branches is a parabolic, graded-index planar waveguide having a maximum refractive index along a central axis of the branch, whereby an input light beam is split within a graded index vertex area of the optically transmissive base, the light beam being split by an overlap between respective numerical apertures of the first and second optically transmissive branches, the parabolic, graded-index planar waveguide defining each of the first and second optically transmissive branches to ensure confined beam propagation therein and to provide for direct mode matching to respective outputs of the laterally extending output surfaces.

5. The planar waveguide converter as recited in claim 4, wherein each of the first and second bent-angled optically transmissive branches of each of the first and second quadrilateral phase shifters is a parabolic, graded-index planar waveguide having a maximum refractive index along a central path of the respective bent-angled optically transmissive branch.

\* \* \* \* \*